United States Patent
Clark et al.

(10) Patent No.: US 9,418,651 B2
(45) Date of Patent: Aug. 16, 2016

(54) METHOD AND APPARATUS FOR MITIGATING FALSE ACCEPTS OF TRIGGER PHRASES

(71) Applicant: Motorola Mobility LLC, Libertyville, IL (US)

(72) Inventors: Joel A Clark, Woodridge, IL (US); Tenkasi V Ramabadran, Oswego, IL (US); Mark A. Jasiuk, Chicago, IL (US)

(73) Assignee: Google Technology Holdings LLC, Mountain View, CA (US)

(*) Notice: Subject to any disclaimer, the term of this patent is extended or adjusted under 35 U.S.C. 154(b) by 227 days.

(21) Appl. No.: 14/050,594

(22) Filed: Oct. 10, 2013

(65) Prior Publication Data

US 2015/0039310 A1 Feb. 5, 2015

Related U.S. Application Data

(60) Provisional application No. 61/860,727, filed on Jul. 31, 2013.

(51) Int. Cl.
*G10L 15/20* (2006.01)
*G10L 15/06* (2013.01)
*G10L 15/22* (2006.01)
*G10L 25/78* (2013.01)

(52) U.S. Cl.
CPC .............. *G10L 15/063* (2013.01); *G10L 15/22* (2013.01); *G10L 15/20* (2013.01); *G10L 2025/783* (2013.01)

(58) Field of Classification Search
CPC ....... G10L 15/00; G10L 15/01; G10L 15/063; G10L 15/065; G10L 15/07; G10L 15/08; G10L 15/144; G10L 15/146; G10L 15/20; G10L 2015/00; G10L 2015/06; G10L 2015/063; G10L 2015/0636; G10L 2015/088; G10L 2015/223; G10L 17/00; G10L 17/005; G10L 17/04; G10L 17/06; G10L 17/08
USPC .......... 704/244, 231, 233, 235, 246, 249, 250, 704/251, 255
See application file for complete search history.

(56) References Cited

U.S. PATENT DOCUMENTS

| | | | | |
|---|---|---|---|---|
| 4,394,538 A | * | 7/1983 | Warren | G10L 15/063 704/251 |
| 4,829,574 A | * | 5/1989 | Dewhurst | G10L 19/02 704/209 |
| 5,825,855 A | * | 10/1998 | Astarabadi | G10L 15/04 379/67.1 |
| 6,947,892 B1 | | 9/2005 | Bauer et al. | |
| 2004/0260547 A1 | | 12/2004 | Cohen et al. | |
| 2013/0013315 A1 | | 1/2013 | Burke et al. | |

FOREIGN PATENT DOCUMENTS

| | | |
|---|---|---|
| CA | 2823175 A1 | 7/2012 |
| WO | 9913456 A1 | 3/1999 |

OTHER PUBLICATIONS

International Search Report and Written Opinion of international application No. PCT/US2014/049212, dated Dec. 2, 2014, 12 pp.
International Preliminary Report on Patentability from International Application No. PCT/US2014/049212, dated Feb. 11, 2016, 10 pp.

* cited by examiner

*Primary Examiner* — Qi Han
(74) *Attorney, Agent, or Firm* — Shumaker & Sieffert, P.A.

(57) ABSTRACT

An electronic device includes a microphone that receives an audio signal, and a processor that is electrically coupled to the microphone. The processor detects a trigger phrase in the received audio signal and measure characteristics of the detected trigger phrase. Based on the measured characteristics of the detected trigger phrase, the processor determines whether the detected trigger phrase is valid.

15 Claims, 6 Drawing Sheets

METHOD AND APPARATUS FOR MITIGATING FALSE ACCEPTS OF TRIGGER PHRASES

CROSS-REFERENCE TO RELATED APPLICATIONS

The present application claims priority to U.S. Provisional Patent Application 61/860,727, filed Jul. 31, 2013.

TECHNICAL FIELD

The present disclosure relates to trigger phrase detection in an audio signal and, more particularly, to methods and devices for mitigating False Accepts (FAs) of trigger phrases and other applications.

BACKGROUND

Although speech recognition has been around for decades, the quality of speech recognition software and hardware has only recently reached a high enough level to appeal to a large number of consumers. One area in which speech recognition has become very popular in recent years is the smartphone and tablet computer industry. Using a speech recognition-enabled device, a consumer can perform such tasks as making phone calls, writing emails, and navigating with GPS using only voice commands.

Speech recognition in such devices is far from perfect, however. When using a speech recognition-enabled device for the first time, the user may need to "train" the speech recognition software to recognize his or her voice. Even after training, however, the speech recognition functions may not work well in all sound environments. For example, the presence of background noise can decrease speech recognition accuracy.

In an always-on audio (AOA) system, a speech recognition-enabled device continuously listens for the occurrence of a trigger phrase. The trigger phrase, when detected, alerts the device that the user is about to issue a voice command or a sequence of voice commands, which are then processed by a speech recognition engine in the device. The system, by continuously listening for the occurrence of the trigger phrase, frees the user from having to manually indicate to the device that the voice command mode is being entered, thus eliminating the need for an action such as pressing a physical button or a virtual button or control on the touch screen of the device. While simplifying the user experience, the AOA system presents a challenge of accurately detecting the occurrence of a trigger phrase. If the presence of the trigger phrase is detected when no trigger phrase has been uttered, an error called False Accept (FA) occurs. It is important to reduce the number of FA errors to a very low level, so as to not degrade the user's experience of interacting with the AOA system.

DRAWINGS

While the appended claims set forth the features of the present techniques with particularity, these techniques may be best understood from the following detailed description taken in conjunction with the accompanying drawings of which:

DESCRIPTION

Figure 1:
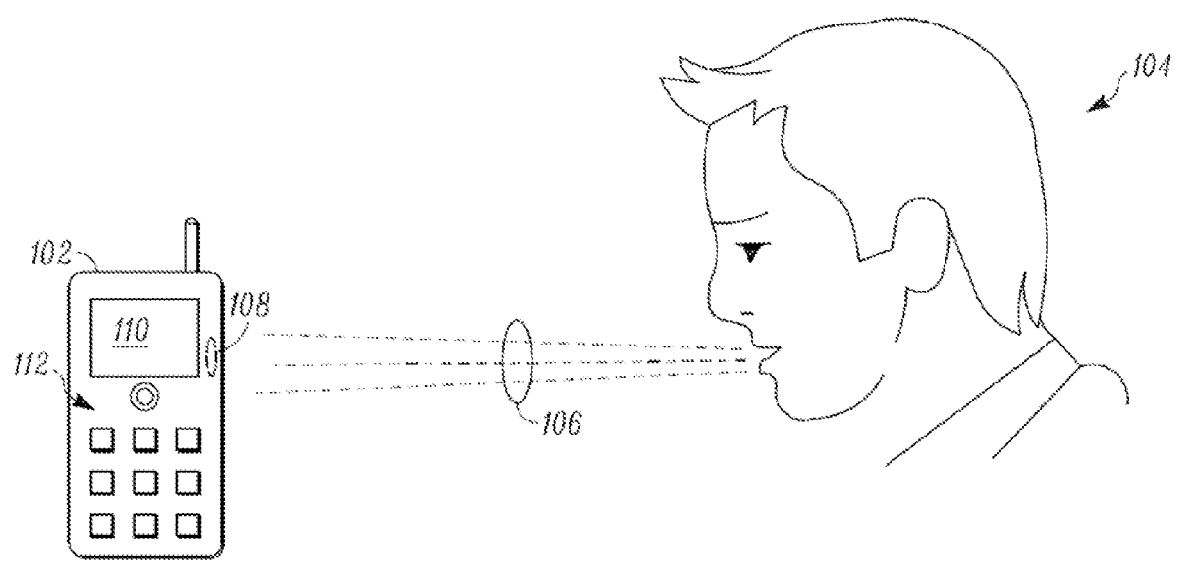
FIG. 1 shows a user speaking to an electronic device, which is depicted as a mobile device in the drawing.

The present disclosure sets forth a method and apparatus for mitigating False Accepts (FAs) of trigger phrases and other applications.

In an embodiment, an electronic device includes a microphone that receives an audio signal, and a processor that is electrically coupled to the microphone. The processor detects a trigger phrase in the received audio signal and measures characteristics of the detected trigger phrase. Based on the measured characteristics of the detected trigger phrase, the processor determines whether the detected trigger phrase is valid.

In another embodiment, an electronic device receives an audio signal corresponding to a detected trigger phrase. The device measures average energy of the detected trigger phrase over a duration of the detected trigger phrase, and compares the measured average energy of the detected trigger phrase to a threshold value. Based on the comparison, the device determines whether the detected trigger phrase is valid. If the average energy of the detected trigger is less than the threshold value, the device rejects the detected trigger phrase as being invalid.

The threshold value may be based on an analysis of characteristics in a data set that includes instances of the trigger phrase, where the characteristics include average energies of the instances of the trigger phrase. In an embodiment, the threshold value may be about −48 dB.

In yet another embodiment, an electronic device receives an audio signal corresponding to a detected trigger phrase. The device measures maximum energy and average energy of the detected trigger phrase over a duration of the detected trigger phrase. The device then calculates a ratio of the maximum energy of the detected trigger phrase to the average energy of the detected trigger phrase, and compares the calculated ratio to a threshold value. Based on the comparison, the device determines whether the detected trigger phrase is valid. If the calculated ratio is greater than the threshold value, the device rejects the detected trigger phrase as being invalid.

The threshold value may be based on an analysis of characteristics in a data set that includes instances of the trigger phrase, where the characteristics include maximum energies of the instances of the trigger phrase and average energies of the instances of the trigger phrase. In an embodiment, the threshold value may be about 15 dB.

In a further embodiment, an electronic device receives an audio signal corresponding to a detected trigger phrase. The device counts the number of voice active frames over a duration of the detected trigger phrase, measures average energy of the detected trigger phrase over the duration of the detected trigger phrase, and measures background noise energy of the audio signal. The device then calculates a ratio of the average energy of the detected trigger phrase to the background noise energy. The device compares the calculated ratio to a first threshold value, and compares the counted number of voice active frames to a second threshold value. Based on the comparisons, the device determines whether the detected trigger phrase is valid. If the calculated ratio is greater than or equal to the first threshold value and the counted number of voice active frames is less than or equal to a second threshold value, the device rejects the detected trigger phrase as being invalid.

The first threshold value may be based on an analysis of characteristics in a data set that includes instances of the trigger phrase, where the characteristics include average energies of the instances of the trigger phrase and background noise energies of the instances of the trigger phrase. In an embodiment, the first threshold value may be about 5 dB.

The second threshold value may be based on a ratio of the number of voice active frames over a trigger phrase duration to the length of the trigger phrase in frames. The ratio of the number of voice active frames over a trigger phrase duration to the length of the trigger phrase in frames may be based on an analysis of characteristics in a data set that includes instances of the trigger phrase, where the characteristics include the ratios of the number of voice active frames over a trigger phrase duration to the length of the trigger phrase in frames in the instances. In an embodiment, the second threshold value may be about 0.4 times the length of the trigger phrase in frames.

The embodiments described herein are usable in the context of always-on audio (AOA). When using AOA, the device 102 (FIG. 1) is capable of waking up from a sleep mode upon receiving a trigger command (i.e., a trigger phrase) from a user. AOA places additional demands on devices, especially mobile devices. AOA is most effective when the device 102 is able to recognize the user's voice commands accurately and quickly.

Referring to FIG. 1, a user 104 provides voice input (or vocalized information or speech) 106 that is received by a speech recognition-enabled electronic device ("device") 102 by way of a microphone (or other sound receiver) 108. The device 102, which is a mobile device in this example, includes a touch screen display 110 that is able to display visual images and to receive or sense touch type inputs as provided by way of a user's finger or other touch input device such as a stylus. Notwithstanding the presence of the touch screen display 110, in the embodiment shown in FIG. 1, the device 102 also has a number of discrete keys or buttons 112 that serve as input devices of the device. However, in other embodiments such keys or buttons (or any particular number of such keys or buttons) need not be present, and the touch screen display 110 can serve as the primary or only user input device.

Although FIG. 1 particularly shows the device 102 as including the touch screen display 110 and keys or buttons 112, these features are only intended to be examples of components/features on the device 102, and in other embodiments the device 102 need not include one or more of these features and/or can include other features in addition to or instead of these features.

The device 102 is intended to be representative of a variety of devices including, for example, cellular telephones, personal digital assistants (PDAs), smart phones, or other handheld or portable electronic devices. In alternate embodiments, the device can also be a headset (e.g., a Bluetooth headset), MP3 player, battery-powered device, a watch device (e.g., a wristwatch) or other wearable device, radio, navigation device, laptop or notebook computer, netbook, pager, PMP (personal media player), DVR (digital video recorders), gaming device, camera, e-reader, e-book, tablet device, navigation device with video capable screen, multimedia docking station, or other device.

Embodiments of the present disclosure are intended to be applicable to any of a variety of electronic devices that are capable of or configured to receive voice input or other sound inputs that are indicative or representative of vocalized information.

Figure 2:
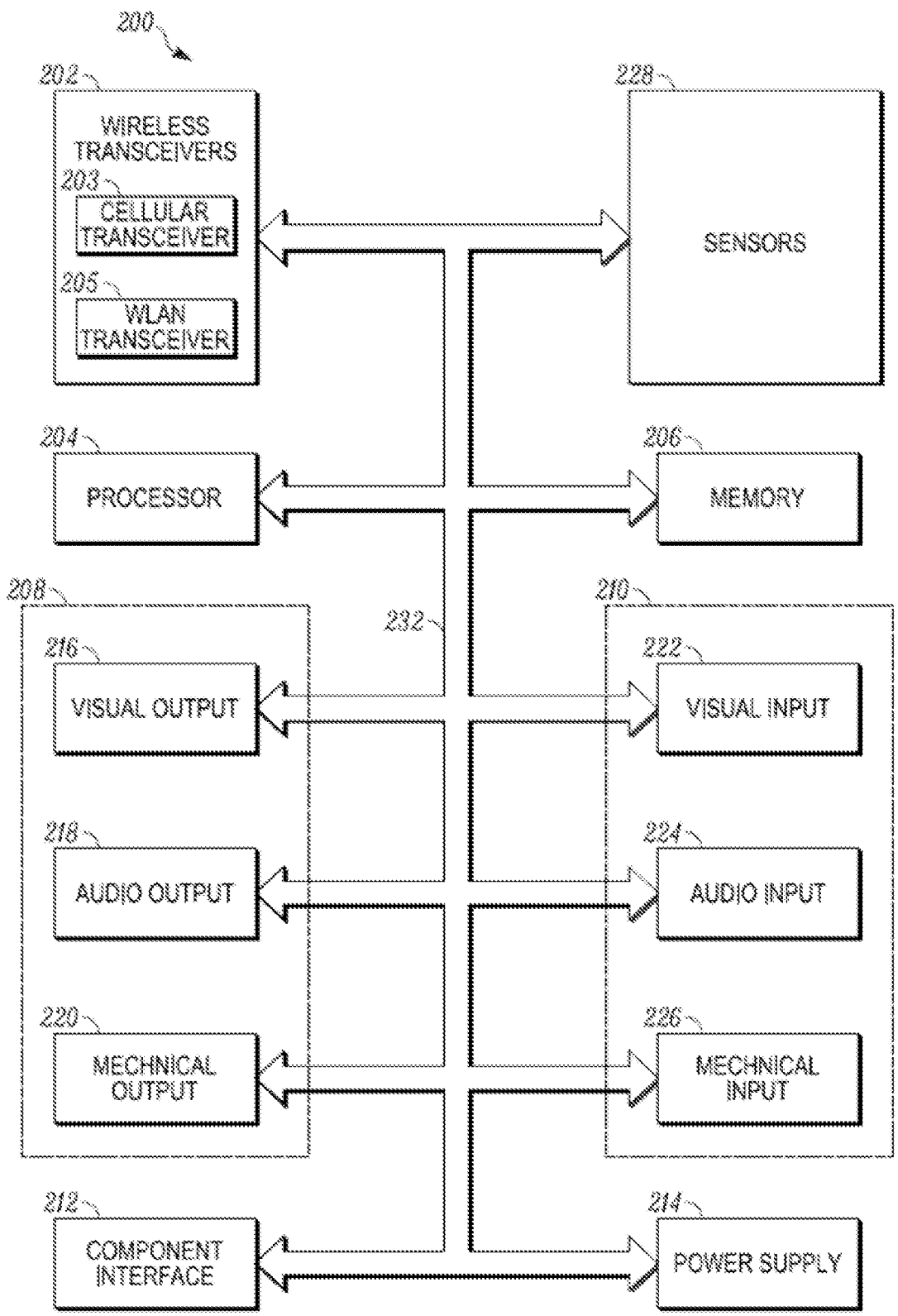
FIG. 2 shows example components of the electronic device of FIG. 1.

FIG. 2 shows internal components of the device 102 of FIG. 1, in accordance with an embodiment of the disclosure.

As shown in FIG. 2, the internal components 200 include one or more wireless transceivers 202, a processor 204 (e.g., a microprocessor, microcomputer, application-specific integrated circuit, etc.), a memory portion 206, one or more output devices 208, and one or more input devices 210. The internal components 200 can further include a component interface 212 to provide a direct connection to auxiliary components or accessories for additional or enhanced functionality. The internal components 200 may also include a power supply 214, such as a battery, for providing power to the other internal components while enabling the mobile device to be portable. Further, the internal components 200 additionally include one or more sensors 228. All of the internal components 200 can be coupled to one another, and in communication with one another, by way of one or more internal communication links 232 (e.g., an internal bus).

Further, in the embodiment of FIG. 2, the wireless transceivers 202 particularly include a cellular transceiver 203 and a Wi-Fi transceiver 205. More particularly, the cellular transceiver 203 is configured to conduct cellular communications, such as 3G, 4G, 4G-LTE, vis-á-vis cell towers (not shown), albeit in other embodiments, the cellular transceiver 203 can be configured to utilize any of a variety of other cellular-based communication technologies such as analog communications (using AMPS), digital communications (using CDMA, TDMA, GSM, iDEN, GPRS, EDGE, etc.), and/or next generation communications (using UMTS, WCDMA, LTE, IEEE 802.16, etc.) or variants thereof.

By contrast, the Wi-Fi transceiver 205 is a wireless local area network (WLAN) transceiver 205 configured to conduct Wi-Fi communications in accordance with the IEEE 802.11 (a, b, g, or n) standard with access points. In other embodiments, the Wi-Fi transceiver 205 can instead (or in addition) conduct other types of communications commonly understood as being encompassed within Wi-Fi communications such as some types of peer-to-peer (e.g., Wi-Fi Peer-to-Peer) communications. Further, in other embodiments, the Wi-Fi transceiver 205 can be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth and/or other wireless communication technologies such as infrared technology.

Although in the present embodiment the device 102 has two of the wireless transceivers 202 (that is, the transceivers 203 and 205), the present disclosure is intended to encompass numerous embodiments in which any arbitrary number of wireless transceivers employing any arbitrary number of communication technologies are present. By virtue of the use of the wireless transceivers 202, the device 102 is capable of communicating with any of a variety of other devices or systems (not shown) including, for example, other mobile devices, web servers, cell towers, access points, other remote devices, etc. Depending upon the embodiment or circumstance, wireless communication between the device 102 and any arbitrary number of other devices or systems can be achieved.

Operation of the wireless transceivers 202 in conjunction with others of the internal components 200 of the device 102 can take a variety of forms. For example, operation of the wireless transceivers 202 can proceed in a manner in which, upon reception of wireless signals, the internal components 200 detect communication signals and the transceivers 202 demodulate the communication signals to recover incoming information, such as voice and/or data, transmitted by the wireless signals. After receiving the incoming information from the transceivers 202, the processor 204 formats the incoming information for the one or more output devices 208. Likewise, for transmission of wireless signals, the processor 204 formats outgoing information, which can but need not be activated by the input devices 210, and conveys the outgoing information to one or more of the wireless transceivers 202 for modulation so as to provide modulated communication signals to be transmitted.

Depending upon the embodiment, the input and output devices 208, 210 of the internal components 200 can include a variety of visual, audio and/or mechanical outputs. For example, the output device(s) 208 can include one or more visual output devices 216 such as a liquid crystal display and/or light emitting diode indicator, one or more audio output devices 218 such as a speaker, alarm, and/or buzzer, and/or one or more mechanical output devices 220 such as a vibrating mechanism. The visual output devices 216 among other things can also include a video screen. Likewise, by example, the input device(s) 210 can include one or more visual input devices 222 such as an optical sensor (for example, a camera lens and photosensor), one or more audio input devices 224 such as the microphone 108 of FIG. 1 (or further for example a microphone of a Bluetooth headset), and/or one or more mechanical input devices 226 such as a flip sensor, keyboard, keypad, selection button, navigation cluster, touch pad, capacitive sensor, motion sensor, and/or switch. Operations that can actuate one or more of the input devices 210 can include not only the physical pressing/actuation of buttons or other actuators, but can also include, for example, opening the mobile device, unlocking the device, moving the device to actuate a motion, moving the device to actuate a location positioning system, and operating the device.

As mentioned above, the internal components 200 also can include one or more of various types of sensors 228 as well as a sensor hub to manage one or more functions of the sensors. The sensors 228 may include, for example, proximity sensors (e.g., a light detecting sensor, an ultrasound transceiver or an infrared transceiver), touch sensors, altitude sensors, and one or more location circuits/components that can include, for example, a Global Positioning System (GPS) receiver, a triangulation receiver, an accelerometer, a tilt sensor, a gyroscope, or any other information collecting device that can identify a current location or user-device interface (carry mode) of the device 102. Although the sensors 228 for the purposes of FIG. 2 are considered to be distinct from the input devices 210, in other embodiments it is possible that one or more of the input devices can also be considered to constitute one or more of the sensors (and vice-versa). Additionally, although in the present embodiment the input devices 210 are shown to be distinct from the output devices 208, it should be recognized that in some embodiments one or more devices serve both as input device(s) and output device(s). In particular, in the present embodiment in which the device 102 includes the touch screen display 110, the touch screen display can be considered to constitute both a visual output device and a mechanical input device (by contrast, the keys or buttons 112 are merely mechanical input devices).

The memory portion 206 of the internal components 200 can encompass one or more memory devices of any of a variety of forms (e.g., read-only memory, random access memory, static random access memory, dynamic random access memory, etc.), and can be used by the processor 204 to store and retrieve data. In some embodiments, the memory portion 206 can be integrated with the processor 204 in a single device (e.g., a processing device including memory or processor-in-memory (PIM)), albeit such a single device will still typically have distinct portions/sections that perform the different processing and memory functions and that can be considered separate devices. In some alternate embodiments, the memory portion 206 of the device 102 can be supplemented or replaced by other memory portion(s) located elsewhere apart from the mobile device and, in such embodiments, the mobile device can be in communication with or access such other memory device(s) by way of any of various communications techniques, for example, wireless communications afforded by the wireless transceivers 202, or connections via the component interface 212.

The data that is stored by the memory portion 206 can include, but need not be limited to, operating systems, programs (applications), modules, and informational data. Each operating system includes executable code that controls basic functions of the device 102, such as interaction among the various components included among the internal components 200, communication with external devices via the wireless transceivers 202 and/or the component interface 212, and storage and retrieval of programs and data, to and from the memory portion 206. As for programs, each program includes executable code that utilizes an operating system to provide more specific functionality, such as file system service and handling of protected and unprotected data stored in the memory portion 206. Such programs can include, among other things, programming for enabling the device 102 to perform a process such as the process for speech recognition shown in FIG. 3 and discussed further below. Finally, with respect to informational data, this is non-executable code or information that can be referenced and/or manipulated by an operating system or program for performing functions of the device 102.

Figure 3:
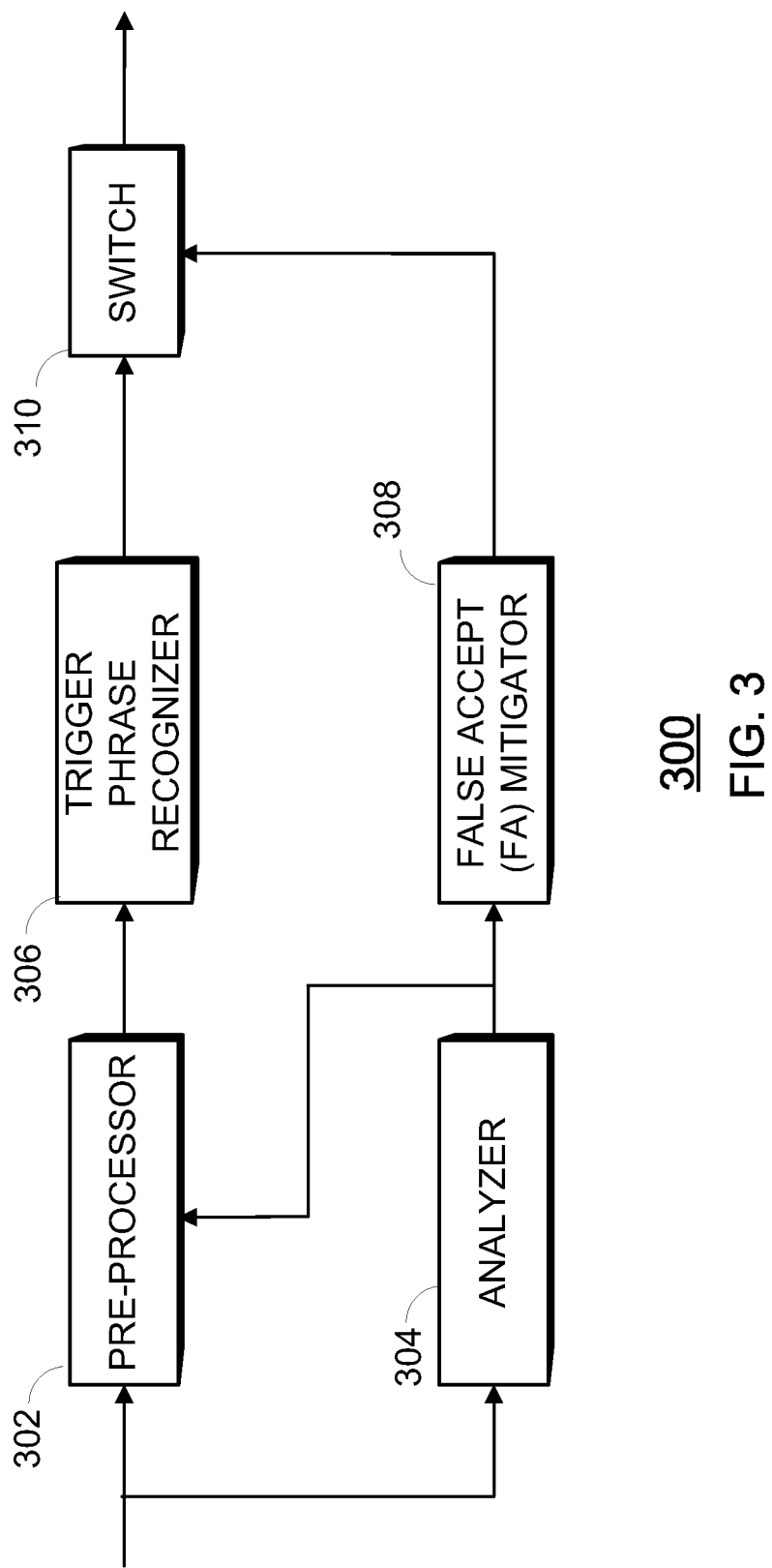
FIG. 3 shows example modules of a processor of the electronic device of FIG. 1.

FIG. 3 shows example modules of a processor 300 of the electronic device of FIG. 1, in accordance with an embodiment of the disclosure. The processor 300 may be an example of the processor 204 shown in FIG. 2. As shown in FIG. 3, the processor 300 includes a pre-processor 302, an analyzer 304, a trigger phrase recognizer 306, a False Accept (FA) mitigator 308, and a switch 310.

The pre-processor 302 pre-processes an input audio signal of the device. To enhance speech recognition accuracy, the pre-processor 302 is able to select a pre-processing technique that is suited to the environment under which the device is operating. The pre-processor 302 is able to select from any of a number of pre-processing techniques (e.g., single microphone noise suppression, two microphone noise suppression, adaptive noise cancellation) and apply the selected technique to the input audio signal. The selection of the appropriate pre-processing technique may depend on the level of background noise as well as the characteristics of the background noise (e.g., variability, spectral shape, etc.).

The analyzer 304 analyzes various characteristics of the input audio signal. For each frame of the input audio signal, the analyzer 304 measures the channel energies and background noise energies of the input audio signal. Based on the measured channel energies and background noise energies in the spectral domain, the analyzer 304 sets the Voice Activity Detection (VAD) flag for the frame. If the analyzer 304 determines that the frame being analyzed contains voice activity, the analyzer 304 sets the VAD flag to 1. Otherwise, the analyzer 304 sets the VAD flag to 0.

After the input audio signal is pre-processed by the pre-processor 302, the trigger phrase recognizer 306 detects a trigger phrase in the pre-processed audio signal. The trigger phrase recognizer 306 always detects the end of the trigger phrase. Sometimes, the trigger phrase recognizer 306 may also detect the start of the trigger phrase. If the trigger phrase recognizer 306 is unable to detect the start of trigger phrase, it may be estimated from the end of the trigger phrase and the average length of the trigger phrase. The average length or duration of the trigger phrase may be determined in an offline analysis, and the device may store the average length of duration of the trigger phrase in the memory 206 (FIG. 2).

In order for the device 102 to detect FA errors, the characteristics of valid instances of the trigger phrase are first identified. This analysis may be performed offline. The characteristics being analyzed may include average energy of the trigger phrase in dB, ratio of the maximum energy of the trigger phrase to the average energy of the trigger phrase over the trigger phrase duration, ratio of the average energy of the trigger phrase to the background noise estimate, and the number of frames within the trigger phrase, which are declared as voice containing frames (i.e., frames for which the VAD flag is set to 1). Based on the analysis, various threshold values may be assigned to each of the analyzed characteristics and stored in the memory 206 of the device 102.

When the trigger phrase recognizer 306 detects the trigger phrase, the FA mitigator 308 determines whether the detected trigger phrase is valid based on various characteristics of the detected trigger phrase measured by the analyzer 304 and the threshold values stored in the memory 206. The characteristics measured by the analyzer 304 are the same as the characteristics that were analyzed offline. Each instance of detected potential trigger phrase is analyzed by the analyzer 304, with the analyzed parameters then input into the FA mitigator 308. Next, based on the output of the FA mitigator 308, the switch 310 determines whether the detected trigger phrase should be accepted or rejected.

Figure 4:
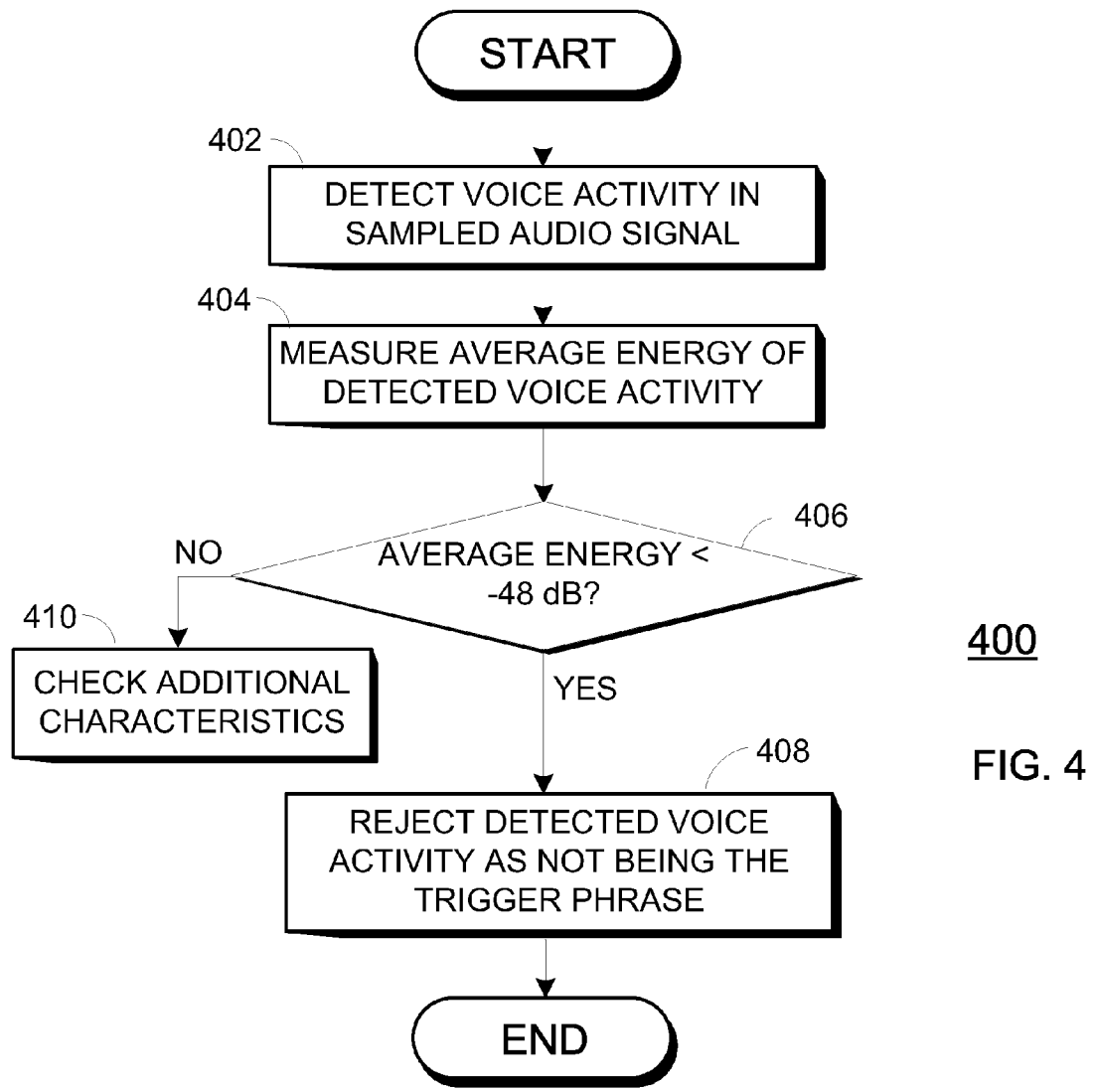
FIGS. 4-6 show steps that may be carried out according to various embodiments.

Referring to FIG. 4, a procedure 400 carried out by the electronic device 102 (FIG. 1) according to an embodiment will now be described. In the present embodiment, the trigger phrase is "Okay Google Now." In other embodiments, however, other trigger phrases may be used.

At step 402, the electronic device 102 receives an audio signal corresponding to a detected trigger phrase. At step 404, the device 102 measures the average energy of the detected trigger phrase over a duration of the trigger phrase.

Next, at step 406, the device 102 compares the measured average energy of the detected trigger phrase to a threshold value. The threshold value may be based on an offline analysis of characteristics in a data set that includes instances of the trigger phrase, where the characteristics include average energies of the instances of the trigger phrase. In the present embodiment, the threshold value may be about −48 dB.

Based on the comparison, the device 102 determines whether the detected trigger phrase is valid. If the average energy of the detected trigger is less than the threshold value (YES of step 406), the device 102 rejects the detected trigger phrase as being invalid at step 408. If the average energy of the detected trigger is equal to or greater than the threshold value (NO of step 406), the device 102 will then check additional characteristics of the detected trigger phrase at step 410 to determine whether the detected trigger phase is valid.

Figure 5:
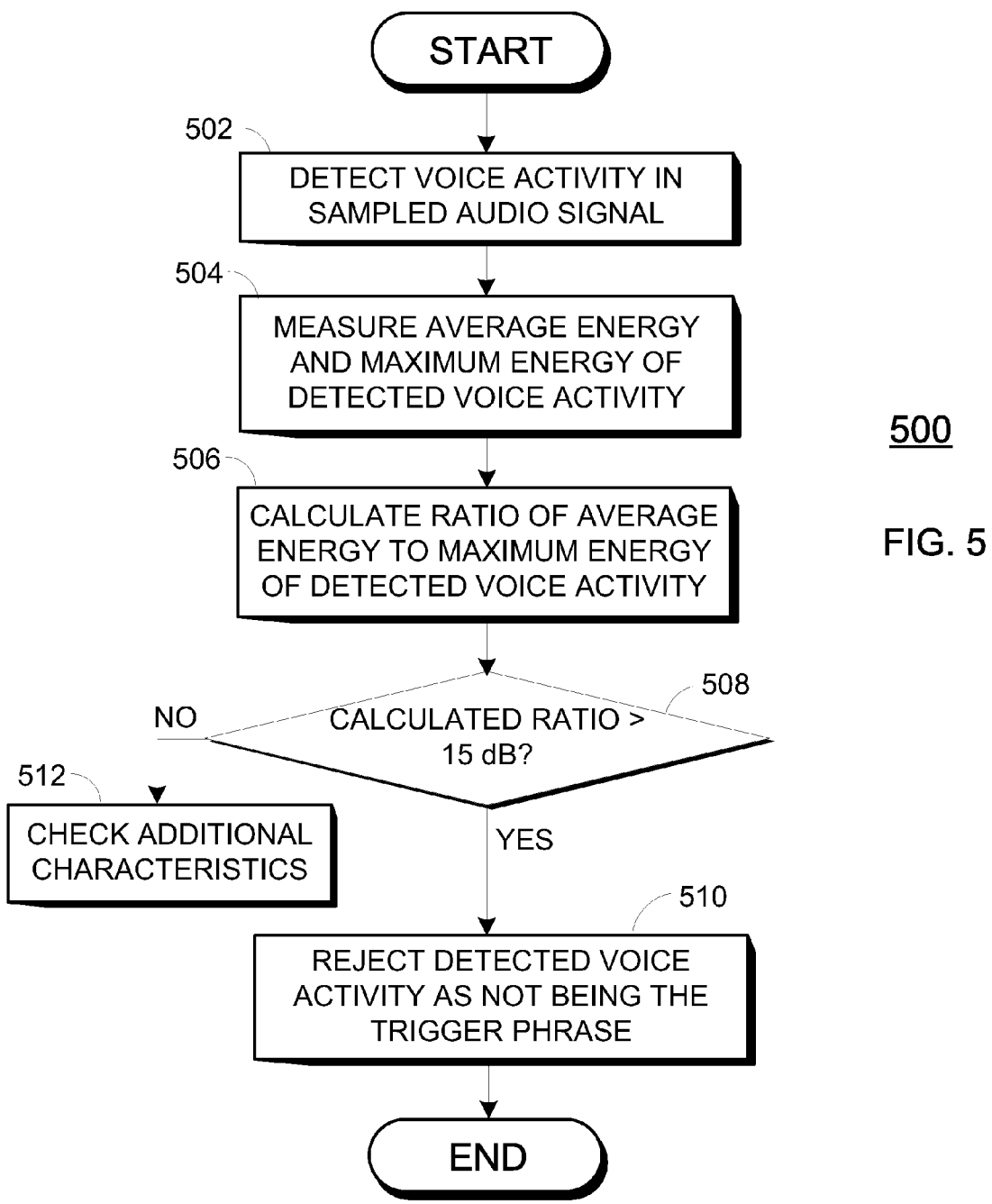

Referring to FIG. 5, a procedure 500 carried out by the electronic device 102 (FIG. 1) according to another embodiment will now be described. In the present embodiment, the trigger phrase is "Okay Google Now." In other embodiments, however, other trigger phrases may be used.

At step 502, the electronic device 102 receives an audio signal corresponding to a detected trigger phrase. At step 504, the device 102 measures maximum energy and average energy of the detected trigger phrase over a duration of the detected trigger phrase. At step 506, the device 102 calculates a ratio of the maximum energy of the detected trigger phrase to the average energy of the detected trigger phrase.

Next, at step 508, the device 102 compares the calculated ratio to a threshold value. The threshold value may be based on an offline analysis of characteristics in a data set that includes instances of the trigger phrase, where the characteristics include maximum energies of the instances of the trigger phrase and average energies of the instances of the trigger phrase. In the present embodiment, the threshold value may be about 15 dB.

Based on the comparison, the device 102 determines whether the detected trigger phrase is valid. If the calculated ratio is greater than the threshold value (YES of step 508), the device 102 rejects the detected trigger phrase as being invalid at step 510. If the calculated ratio is equal to or less than the threshold value (NO of step 508), the device 102 will then check additional characteristics of the detected trigger phrase at step 512 to determine whether the detected trigger phrase is valid.

Figure 6:
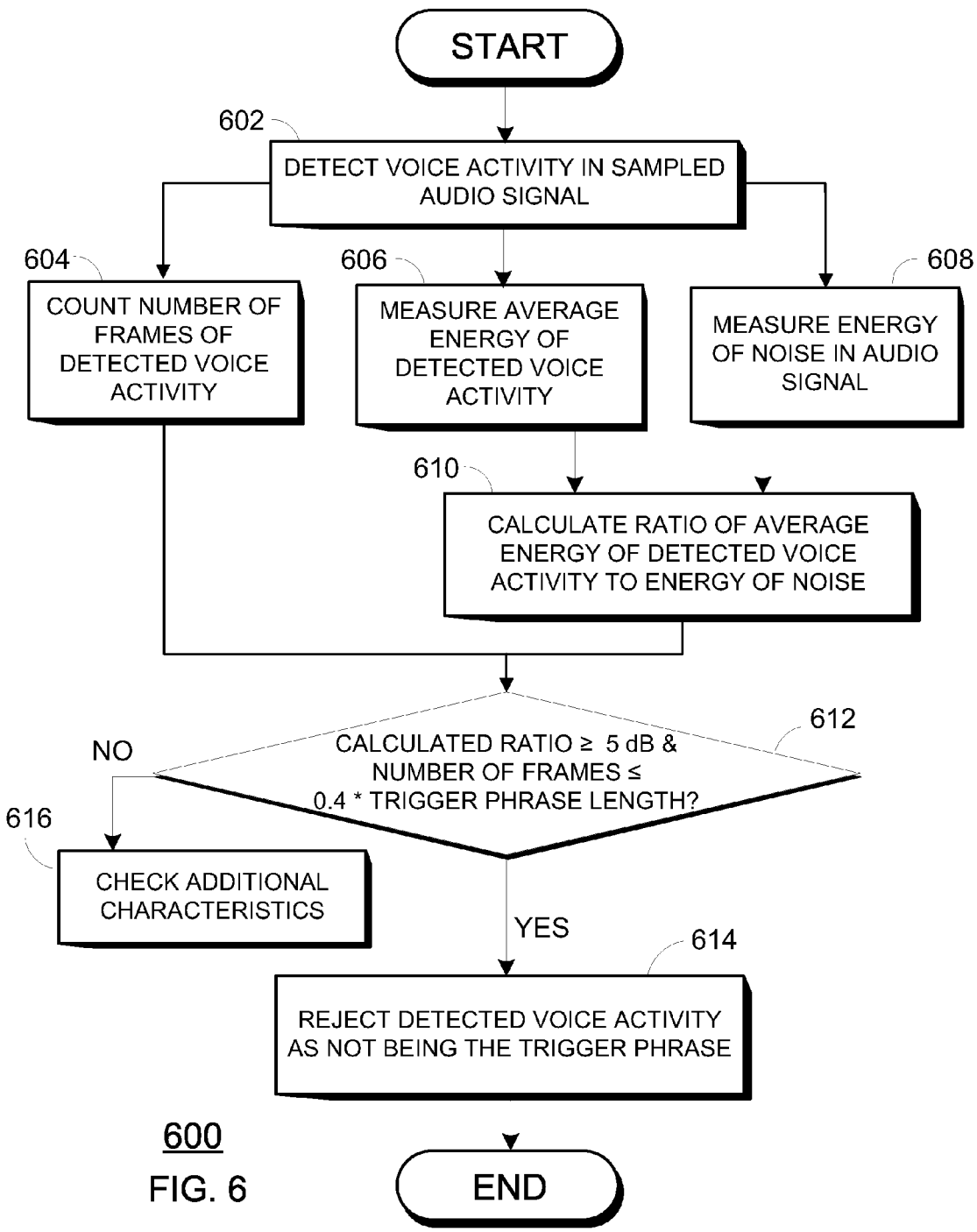

Referring to FIG. 6, a procedure 600 carried out by the electronic device 102 (FIG. 1) according to yet another embodiment will now be described. In the present embodiment, the trigger phrase is "Okay Google Now." In other embodiments, however, other trigger phrases may be used.

At step 602, the electronic device 102 receives an audio signal corresponding to a detected trigger phrase. At step 604, the device 102 counts the number of voice active frames (i.e., frames with VAD flag=1) over a duration of the detected trigger phrase. At step 606, the device 102 measures average energy of the detected trigger phrase over the duration of the detected trigger phrase. At step 608, the device 102 measures background noise energy of the received audio signal. Then, at step 610, the device 102 calculates a ratio of the average energy of the detected trigger phrase to the background noise energy.

Next, at step 612, the device 102 compares the calculated ratio to a first threshold value, and compares the counted number of voice active frames to a second threshold value. Based on the comparisons, the device 102 determines whether the detected trigger phrase is valid. If the calculated ratio is greater than or equal to the first threshold value and the counted number of voice active frames is less than or equal to a second threshold value (YES of step 612), the device 102 rejects the detected trigger phrase as being invalid. If the ratio is less than the first threshold value, or if the number of voice active frames is greater than the second threshold value, the device 102 will then check additional characteristics of the detected trigger phrase at step 616.

In the present embodiment, the first threshold value may be based on an offline analysis of characteristics in a data set that includes instances of the trigger phrase, where the characteristics include average energies of the instances of the trigger phrase and background noise energies of the instances of the trigger phrase. Here, the first threshold value may be about 5 dB.

In addition, the second threshold value may be based on a ratio of the number of voice active frames over a trigger phrase duration to the length of the trigger phrase in frames. The ratio of the number of voice active frames over a trigger phrase duration to the length of the trigger phrase in frames may be based on an analysis of characteristics in a data set that includes instances of the trigger phrase, where the characteristics include the ratios of the number of voice active frames over a trigger phrase duration to the length of the trigger phrase in frames in the instances. Here, the second threshold value may be about 0.4 times the length of the trigger phrase in frames.

In the various embodiments, the threshold values are dependent on the particular characteristics of a trigger phrase. Therefore, the threshold values may vary based on the number of words, syllables, or phonemes in a trigger phrase. Accordingly, the threshold values presented in the current disclosure are exemplary only and should not be construed as limiting.

All signal/noise dB values presented in the disclosure are dB-FS, i.e., dB (full-scale). This means that when the signal is full-scale (e.g., +/−32768 for 16-bit representation of signal samples), the corresponding reference dB level is 0.

It can be seen from the foregoing that a method for apparatus for mitigating False Accepts (FAs) of trigger phrases has been provided. In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

What is claimed is:

1. A method comprising:
   receiving, by an electronic device operating in a sleep mode, an audio signal;
   detecting, by the electronic device, a trigger phrase in the audio signal;
   determining, by the electronic device, an average energy of the trigger phrase over a duration of the trigger phrase;
   determining, by the electronic device, a maximum energy of the trigger phrase;
   determining, by the electronic device, a ratio of the maximum energy of the trigger phrase to the average energy of the trigger phrase;
   determining, by the electronic device, whether the ratio is greater than a threshold value;
   responsive to determining that the ratio is greater than the threshold value, rejecting the trigger phrase as being invalid;
   responsive to determining that the ratio is not greater than the threshold value, determining, by the electronic device, that the trigger phrase is valid; and
   responsive to determining that the trigger phrase is valid:
      transitioning, by the electronic device, from operating in the sleep mode to operating in a wake mode;
      receiving, by the electronic device, at least one voice command; and
      processing, by the electronic device, the at least one voice command.

2. The method of claim 1, further comprising:
   determining the threshold value by at least analyzing characteristics in a data set that includes instances of the trigger phrase, wherein the characteristics include maximum energies of the instances of the trigger phrase and average energies of the instances of the trigger phrase.

3. The method of claim 1, wherein the threshold value is 15 dB.

4. A method comprising:
   receiving, by an electronic device operating in a sleep mode, an audio signal that includes a plurality of frames;
   detecting, by the electronic device, a trigger phrase in the audio signal, wherein the trigger phrase spans at least a portion of the plurality of frames;
   determining, by the electronic device, a number of frames included in the portion of the plurality of frames;
   determining, by the electronic device, an average energy of the portion of the plurality of frames;
   determining, by the electronic device, a background noise energy of the portion of the plurality of frames;
   calculating a ratio of the average energy to the background noise energy;
   determining whether the ratio is less than a first threshold value;
   determining whether the number of frames is greater than a second threshold value;
   responsive to determining that the ratio is less than the first threshold value and the number of frames is greater than the second threshold value, determining that the phrase is valid and transitioning, by the electronic device, from operating in the sleep mode to operating in a wake mode; and
   responsive to determining that the ratio is greater than or equal to the first threshold value and the number of frames is less than or equal to the second threshold value, rejecting the trigger phrase as being invalid.

5. The method of claim 4, further comprising:
   determining the first threshold value by at least analyzing characteristics in a data set that includes instances of the trigger phrase, wherein the characteristics include average energies of the instances of the trigger phrase and background noise energies of the instances of the trigger phrase.

6. The method of claim 4, wherein the first threshold value is 5 dB.

7. The method of claim 4, further comprising:
   determining, based on a ratio of the number of voice active frames over a trigger phrase duration to the length of the trigger phrase in frames, the second threshold value.

8. The method of claim 7, further comprising:
   determining the ratio of the number of voice active frames over the trigger phrase duration to the length of the trigger phrase by at least analyzing characteristics in a data set that includes instances of the trigger phrase, wherein the characteristics include the ratios of the number of voice active frames over the trigger phrase duration to the length of the trigger phrase in the instances.

9. The method of claim 4, wherein the second threshold value is 0.4 times the length of the trigger phrase in frames.

10. A device comprising:
    a microphone configured to detect an audio signal that includes a trigger phrase and background noise; and
    a processor configured to:
       determine that the audio signal includes the trigger phrase that spans a plurality of frames of the audio signal;
       determine a respective channel energy and a respective background noise energy in the plurality of frames of the audio signal;
       determine, based on the respective channel energy and the respective background noise energy, whether each frame from the plurality of frames includes voice activity;
       determine a number of the frames from the plurality of frames that include the voice activity;
       determine, based on the respective channel energies for the plurality of frames, an average channel energy for the plurality of frames;
       determine, based on the respective background noise energies for the plurality of frames, an average background noise energy;
       determine a ratio of the average channel energy to the average background noise energy;
       determine whether the ratio satisfies a first threshold value;

determine whether the number of frames that include the voice activity satisfies a second threshold value; and responsive to determining that the ratio satisfies the first threshold value and that the number of frames satisfies the second threshold, determine that the trigger phrase is valid and transition, by the electronic device, from operating in a sleep mode to operating in a wake mode.

11. The device of claim 10, wherein the processor is further configured to:

determine the first threshold value by at least analyzing characteristics in a data set that includes instances of the trigger phrase, wherein the characteristics include average energies of the instances of the trigger phrase and background noise energies of the instances of the trigger phrase.

12. The device of claim 10, wherein the first threshold value is 5 dB.

13. The device of claim 10, wherein the processor is further configured to:

determine, based on a ratio of the number of voice active frames over a trigger phrase duration to the length of the trigger phrase in frames, the second threshold value.

14. The device of claim 13, wherein the processor is further configured to:

determine the ratio of the number of voice active frames over the trigger phrase duration to the length of the trigger phrase by at least analyzing characteristics in a data set that includes instances of the trigger phrase, wherein the characteristics include the ratios of the number of voice active frames over the trigger phrase duration to the length of the trigger phrase in the instances.

15. The device of claim 10, wherein the second threshold value is 0.4 times the length of the trigger phrase in frames.

* * * * *